United States Patent

Sharma et al.

[11] Patent Number: 5,480,920
[45] Date of Patent: Jan. 2, 1996

[54] OZONE-FRIENDLY CORRECTION FLUID

[75] Inventors: Mahendra K. Sharma; Suzanne W. Dobbs; John J. Hiller, all of Kingsport, Tenn.

[73] Assignee: Eastman Chemical Company, Kingsport, Tenn.

[21] Appl. No.: 289,455

[22] Filed: Aug. 12, 1994

[51] Int. Cl.$^6$ .................................................. C09D 11/10
[52] U.S. Cl. ...................... 523/161; 524/365; 524/451; 524/495; 524/496; 106/19 A; 106/19 R; 106/23 B; 106/188; 106/204
[58] Field of Search ................. 523/161; 106/19 R, 106/23 B, 19 A, 188, 204; 524/451, 495, 496, 365

[56] References Cited

U.S. PATENT DOCUMENTS

| | | | |
|---|---|---|---|
| 4,165,988 | 8/1979 | Page et al. | 106/23 B |
| 5,199,976 | 4/1993 | Yau et al. | 106/19 A |
| 5,256,191 | 10/1993 | Thompson et al. | 106/19 A |
| 5,306,755 | 4/1994 | Yau et al. | 524/296 |

FOREIGN PATENT DOCUMENTS 2058110  7/1980  United Kingdom.

*Primary Examiner*—Paul R. Michl
*Assistant Examiner*—John J. Guarriello
*Attorney, Agent, or Firm*—John D. Thallemer; Harry J. Gwinnell

[57] ABSTRACT

The present invention relates to an ozone-friendly correction fluid which dries quickly and bonds to paper surfaces for correcting all types of markings. The ozone-friendly correction fluid does not contain halogenated solvents or hydrocarbon solvents. More specifically, the correction fluid contains an acrylic resin having a weight average molecular weight (Mw) less than 40,000, acetone, and an opacifying pigment. The ozone-friendly correction fluid of the present invention may contain up to 80% solids and may be applied for correcting typewritten, handwritten, photocopied or laser-jet printed markings formed from waterborne or solventborne inks.

12 Claims, No Drawings

OZONE-FRIENDLY CORRECTION FLUID

FIELD OF THE INVENTION

The present invention relates to an ozone-friendly correction fluid which does not contain halogenated solvents or hydrocarbon solvents.

BACKGROUND OF THE INVENTION

Commercial products available for correcting typewritten, handwritten, and photocopy markings on papers are formulated using halogenated solvents and/or hydrocarbons to obtain the desired performance properties of the film. A typical correction fluid composition contains an opacifying agent such as titanium dioxide, a binder, a dispersing agent and a solvent or a mixture of solvents. The binder is generally a film forming polymer soluble in the selected solvent medium which also binds pigments to paper substrate. The solvent acts as a carrier for the ingredients in the correction fluid.

Halogenated hydrocarbon solvents are generally the solvent of choice in correction fluids because halogenated hydrocarbons dry rapidly without interacting with typewritten markings to cause unacceptable bleeding. Halogenated hydrocarbons also have the advantage of dissolving the polymeric-film forming material which provides a flexible and durable film. The use of halogenated hydrocarbon solvents, however, present several health and environmental problems. Halogenated and nonhalogenated hydrocarbon vapors which are generated during drying of the correction fluid are harmful to the health of workers and users. Moreover, halogenated hydrocarbon vapors adversely effect the environment by depleting stratospheric ozone.

U.S. Pat. Nos. 5,199,976 and 5,256,191, and U.K. Pat. App. No. GB 2,058,110 disclose correction fluids which either are free from material that migrates to the stratosphere or, in case it contains such a material, the material does not cause appreciable effect on reducing ozone concentration. U.S. Pat. No. 5,199,976 discloses a correction fluid containing a hydrocarbon solvent, a vinyl toluene-butadiene copolymer as the polymeric-film forming material, a dispersing agent and an opacifying pigment. Such hydrocarbon solvents, however, release volatile organic compounds into the air, and thus, present a health risk to workers and users.

U.S. Pat. No. 5,256,191 discloses a substantially nontoxic correction fluid which contains an opacifying pigment dispersed in a solution of a nonhalogenated solvent, a siloxane and an acrylic resin having a weight average molecular weight of 50,000 to 500,000. The solvents used include siloxane(s) and polar solvents such as ethyl alcohol, isopropanol, methyl ethylketone and ethyl acetate. Such polar solvents, however, release volatile organic compounds into the air, and thus, present a health risk to workers and users. Moreover, the use of high molecular weight acrylic resins results in solutions which are too viscous to add enough opacifying pigment to provide the necessary hiding power.

U.K. Pat. App. No. GB 2,058,110A discloses an aqueous correction fluid containing a stable emulsion of a water-dispersed, water-insoluble acrylic resin as a binder for the masking pigment. While, the correction fluid forms smooth, highly opaque, and flexible masking coatings, it has an unacceptable drying time due to a water content in the range of 25 to 50 weight percent.

Accordingly, what is needed is a correction fluid which does not contain halogenated solvents or hydrocarbon solvents, but which can be used to correct all types of markings (e.g. typewritten, handwritten, photocopied and laser-jet printed) formed with waterborne or solventborne inks.

SUMMARY OF THE INVENTION

The present invention is directed to an ozone-friendly correction fluid having a solids content of 50 to 80 percent comprising: (A) 5–20 weight percent of an acrylic polymer having repeating units of the formula:

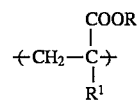

wherein R is selected from the group consisting of hydrogen and an alkyl group having 1 to 20 carbon atoms, and $R^1$ is selected from the group consisting of hydrogen and methyl, provided the acrylic polymer has a weight average molecular weight less than 40,000; (B) 20 to 60 weight percent an opacifying pigment; and (C) 15 to 25 weight percent of acetone.

DESCRIPTION OF THE INVENTION

The ozone-friendly correction fluid of the present invention contains an acrylic polymer, an opacifying pigment, and acetone. By "ozone-friendly" it is meant that the correction fluid does not contain halogenated solvents. In addition, the ozone-friendly correction fluid does not contain hydrocarbon solvents which are known to be carcinogenic.

Component (A) of the correction fluid is an acrylic polymer. The acrylic polymer has the general formula:

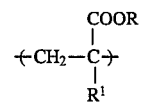

In the above formula, R is hydrogen, a straight, branched, or cyclic alkyl group having 1 to 20 carbon atoms optionally substituted with up to 2 substituents selected from $C_1$–$C_6$ alkoxy and halogen; and $R^1$ is hydrogen or methyl. Preferably, R is a straight, branched, or cyclic alkyl group having 1 to 10 carbon atoms optionally substituted with up to 2 substituents selected from $C_1$–$C_6$ alkoxy, chloro and bromo. More preferably, R is either hydrogen, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, or cyclohexyl.

Monomers used to prepare the acrylic polymer include styrene, α-methyl styrene, methacrylate (MA), methylmethacrylate (MMA), ethyl acrylate (EA), butylacrylate (BA), butylmethacrylate (BMA), 2-ethylhexylacrylate (EHA), 2-hydroxyethyl acrylate (HEA), hydroxyethylmethacrylate (HEMA), acrylic acid (AA), acrylamide, maleic anhydride, acrylonitrile and their derivatives.

The acrylic polymer has a weight average molecular weight (Mw) of 4,000 to 40,000, more preferably 4,000 to 20,000. Most preferably, the acrylic polymer has a weight average molecular weight of 4,000 to 15,000. It has been determined that the use of acrylic polymers having a weight average molecular weight of greater than 40,000 results in solutions which are too viscous to add enough opacifying pigment to provide the necessary hiding power.

The acrylic polymer has an acid number (NV) of 50 to 300, preferably, 200 to 250. The acrylic polymer has a glass transition temperature (Tg) of greater than 0° C., preferably, 5° C. to 85° C. More preferably, the glass transition temperature is 30° C. to 70° C. The acrylic polymer may optionally contain styrene repeating units, acrylonitrile repeating units, or a combination thereof. The acrylic polymer is present in the ozone-friendly correction fluid in an amount of 5 to 20 weight percent based on total weight of the correction fluid. Preferably, the acrylic polymer is present in an amount of 7 to 15 weight percent.

Useful acrylic polymers are commercially available under the tradename "JONCRYL" from S.C. Johnson and Sons, Inc., Racine, Wis. 43403, U.S.A., and "Vancryl" from Vantage. Especially preferred are JONCRYL 67, JONCRYL 586, JONCRYL 611, JONCRYL 678, JONCRYL 680, JONCRYL 682, JONCRYL 683, JONCRYL 690, and JONCRYL 693 which are styreneated acrylic resins having 98% nonvolatile and 2% by weight volatile organic compounds, and are available in the form of clear flakes.

In addition to the acrylic polymer, the correction fluid may optionally contain 2 to 10, preferably, 3 to 6 weight percent based on the weight of the correction fluid of an acrylic emulsion. The presence of the acrylic emulsion increases the glossiness of the film formed from the correction fluid. The acrylic emulsion polymer contains a high molecular weight acrylic polymer which has a weight average molecular weight of about 100,000 to about 500,000, preferably 200,000 to 400,000. The acrylic emulsion polymer has an acid number of 50 to 200, preferably 50 to 100. The acrylic emulsion has a glass transition temperature of −20° C. to 120° C., preferably, 10° C. to 50° C. The acrylic emulsion may optionally contain styrene repeating units, acrylonitrile repeating units, or a combination thereof. Useful acrylic emulsions are commercially available under the tradename "JONCRYL", especially JONCRYL 77 and JONCRYL 74 which are styrene\acrylic copolymers dispersed in water from S.C. Johnson and Sons, Inc., Racine, Wisconsin.

Component (B) of the ozone-friendly correction fluid is an opacifying pigment. Any suitable opacifying pigment having adequate hiding power to cover a desired type of marking, e.g., photocopied or typed, on a paper surface, may be utilized in the correction fluids of this invention. Titanium dioxide is preferred because it provides a basic white color which can be toned to meet a variety of requirements depending on the paper stock with which the correction fluid is to be applied. The grade of titanium dioxide such as rutile titanium dioxide and anatase titanium dioxide, is selected based upon the desired texture of the composition. Preferred grades of titanium dioxide are available under the trademark TRONOX from Kerr-McGee and include TRONOX CR-800, TRONOX CR-822, TRONOX CR-834, and TRONOX CR-837, which are surface modified using titana and silica.

Additional opacifying pigments include zinc sulfide, zinc oxide, etc., which can be used alone or in combination with titanium dioxide. Preferably, the average particle size of the opacifying pigment is less than 0.5 microns. The amount of opacifying pigment in the correction fluid can vary widely depending on the degree of coverage desired. It is preferred that the correction fluid contains 20 to 60 weight percent of opacifying pigment, and preferably 25 to 55 weight percent. More preferably, the correction fluid contains 30 to 50 weight percent of opacifying pigment.

component (C) of the ozone-friendly correction fluid is acetone. The acetone dissolves the acrylic polymer, component (A), and acts as a carrier for the ingredients in the correction fluid. The acetone is present in an amount of 15 to 25 weight percent of the correction fluid, preferably 18 to 22 weight percent. Up to 10% of the acetone may be substituted with another solvent such as an alcohol, ester, ether or ketone, provided that the combination of acetone and other solvent is able to dissolve the acrylic polymer. The present inventors have determined that the low molecular weight acrylic polymer, component (A), forms a solution in acetone but not in other similar solvents such as ethyl acetate.

The correction fluids of the present invention can include additives such as fillers, for example, talc which acts as a filler and levelling agent, clay, silica, fragrances, freeze-thaw stabilizers, dispersing agents, gums, leveling agents, chelating agents, colorants, dyes, pigments, defoamers, and the like normally used in correction fluids may be used if desired. Such additives, their amounts, and their use are well known in the art. For example, carbon black or lamp black may be incorporated as a coloring pigment to match the color of the correction fluid to white paper. Color pigments like yellow oxide and raw amber may be incorporated to match the color of the correction fluid to colored paper.

The viscosity of the correction fluid of the present invention is in the range of 200–2000 cps. However, depending on the specific application, a viscosity reducing agent may optionally be added to reduce the viscosity of the correction fluid. Suitable viscosity reducing agents include: propylene glycol, glycerol, n-propanol, isopropanol, and butanol. A preferred viscosity range for the correction fluid is 200 to 800 cps at a shear rate of 30 reciprocal seconds. Some of the viscosity reducing agents may also function as freeze-thaw stabilizers.

The correction fluids of the present invention exhibit relatively short drying times, typically less than 60 seconds, and preferably 20 to 40 seconds. The correction fluids can be tested for drying time by applying the fluid on the marking to be corrected and at 5 second intervals determining the time when you can write over or type over the fluid without disturbing the surface of the corrected mark. The compositions also exhibit little or no settling over time. In addition, the compositions exhibit good flow properties, bonding and flexibility. The correction fluid of the present invention forms a film on all types of markings including typewritten, handwritten, photocopied and laser-jet printed markings whether generated from waterborne or solventborne inks. The correction fluid covers photocopied and laser-jet printed markings especially well.

A process for preparing the ozone-friendly correction fluid of the present invention involves dissolving the acrylic resin in acetone at room temperature, about 25° C. while stirring to form a clear acrylic resin solution. Optionally, an acrylic emulsion (about 5–20 weight percent) may be added slowly at room temperature to the resin solution. An opacifying pigment(s) is added slowly to the acrylic resin solution while continuously stirring. After complete dispersion of the opacifying pigment, a viscosity reducing agent and/or other additives may be added while stirring. The homogeneous slurry that results is stored in an air tight container.

The materials and testing procedures used for the results shown herein are as follows:

Glass transition temperature (Tg) was determined using a differential scanning calorimeter (DSC).

Weight Percent Solids was determined either using a Computrac® LX-50 available from Arizona Instruments, Phoenix, AZ, or by placing sample in an oven for 24 hours at 100° C.

The following acrylic polymers were used in the examples: JONCRYL 678 and JONCRYL 680. Both polymers are solid acrylic resins which are available as clear flakes from Johnson Wax. JONCRYL 678 has a weight average molecular weight of 8,500, an acid number of 215, and a glass transition temperature of 85° C. JONCRYL 680 has a weight average molecular weight of 4,900, an acid number of 215, and a glass transition temperature of 67° C.

The acrylic emulsion used in some examples was JONCRYL 77® which is an acrylic emulsion available from Johnson Wax and is prepared from an acrylic polymer having a weight average molecular weight of >200,000, an acid number of 55, and a Tg of 21° C.

Carbon Black used in some examples is available under the trademark DARCO D-60 from the T.J. Baker Chemical Company.

Talc used in some examples is available under the trademark ALPHAFIL-600.

Titanium dioxide ($TiO_2$) used in the examples is available under the trademark Tronox® from Kerr-McGee.

The invention will be further illustrated by a consideration of the following examples, which are intended to be exemplary of the invention.

EXAMPLE 1

Preparation of a 70% solids ozone-friendly correction fluid.

| Ingredients | Amount (g) | (%) |
|---|---|---|
| JONCRYL - 678 Flakes | 31.5 | 9.69 |
| Titanium dioxide (TRONOX CR-800) | 150.0 | 46.15 |
| Talc | 30.0 | 9.23 |
| Propylene Glycol | 45.0 | 13.85 |
| Acetone | 52.8 | 16.25 |
| Water | 15.7 | 4.83 |

The JONCRYL-678 acrylic resin flakes were dissolved in acetone while stirring with a Waring Commercial Blender to form a solution. Stirring was continued and water was slowly added to the solution in order to avoid precipitation of the acrylic resin. $TiO_2$ and Talc were mixed in the dry powder form and then added to the solution while stirring to form a slurry. Propylene glycol was added while stirring to reduce the viscosity of the slurry. The correction fluid was stored in a container with an applicator brush.

EXAMPLE 2

The ozone-friendly correction fluid prepared in Example 1 was applied on ink-jet printed paper using an applicator brush. The film formed from the correction fluid was visually assessed and rated 1(poor), 2(fair), 3(good) or 4(excellent).

| Properties of the Film | Visual Rating |
|---|---|
| Film Coverage | 3 (Good) |
| Film Drying | 4 (Excellent) |
| Film Smoothness | 3 (Good) |
| Film Flexibility | 4 (Excellent) |
| Hiding Power on Ink-Jet Printed Paper | 4 (Excellent) |

The results clearly show that the film formed from the ozone-friendly correction fluid of Example 1 exhibited acceptable properties. The viscosity of the correction fluid remained unchanged even after storing for four months.

EXAMPLE 3

The ozone-friendly correction fluid prepared in Example 1 was compared on typing paper with a commercial correction fluid from the Gillette Company which contained a hydrocarbon solvent and had a solids content of 55–59 weight percent. The films formed from the correction fluids were rated 1(poor), 2(fair), 3(good) or 4(excellent).

| Properties of the Film | Visual Rating | |
|---|---|---|
| | Ozone-Friendly (Present Invention) | Hydrocarbon Solvent (Gillette Co.) |
| Film Coverage | 4 | 4 |
| Film Flexibility | 4 | 4 |
| Film Smoothness | 4 | 4 |
| Film Drying | 4 | 4 |
| Hiding | 3 | 3 |
| Smell | 4 | 3 |

The results clearly show that the ozone-friendly correction fluid of the present invention has essentially the same performance properties as a correction fluid containing hydrocarbon solvents. The acetone used as a solvent in the ozone-friendly correction fluid does not display as much of an odor as the correction fluid containing the commercially available hydrocarbon solvents.

EXAMPLE 4

Preparation of a 75% solids ozone-friendly correction fluid.

| Ingredients | Amount (g) | (%) |
|---|---|---|
| JONCRYL - 678 Flakes | 60.0 | 9.67 |
| JONCRYL - 77 Emulsion (45% solid) | 30.0 | 4.84 |
| Titanium dioxide (TRONOX CR-822) | 300.0 | 48.37 |
| Talc | 60.0 | 9.67 |
| Carbon Black | 0.23 | 0.04 |
| Propylene Glycol | 30.0 | 4.84 |
| Acetone | 140.0 | 22.57 |

The JONCRYL-678 acrylic resin flakes were dissolved in acetone while stirring with a Waring Commercial Blender to form a solution. JONCRYL 77 Emulsion was slowly added to the solution. $TiO_2$ and Talc were mixed in the dry powder form and then added to the solution with stirring to form a slurry. Propylene glycol was added to the slurry while stirring to reduce the viscosity of the slurry. Carbon black was added to the slurry while stirring to match the color of the correction fluid with the paper to which it was applied. The high solids content of the correction fluid was achieved because of the low molecular weight of JONCRYL-678 polymer used for titanium dioxide dispersion. The correction fluid was stored in a container with an applicator brush.

The correction fluid was applied to paper and formed a film which displayed excellent film coverage, film drying, film smoothness, film flexibility, and hiding power on ink-jet printed paper.

EXAMPLE 5

Preparation of a 74.5% solids ozone-friendly correction fluid. Example 4 was repeated with the exception that JONCRYL-680 acrylic polymer was used instead of JONCRYL-678 and carbon black was left out.

| Ingredients | Amount (g) | (%) |
| --- | --- | --- |
| JONCRYL - 680 Flakes | 30.0 | 9.23 |
| JONCRYL - 77 Emulsion (45% solid) | 15.0 | 4.62 |
| Titanium dioxide (TRONOX CR-800) | 150.0 | 46.15 |
| Talc | 30.0 | 9.23 |
| Propylene Glycol | 30.0 | 9.23 |
| Acetone | 70.0 | 21.54 |

The correction fluid was applied to paper and formed a film which displayed excellent film coverage, film drying, film smoothness, film flexibility, and hiding power on ink-jet printed paper. However, the film was slightly less glossy compared to the correction fluid film formed in Example 4 which contained JONCRYL-678 instead of JONCRYL-680.

EXAMPLE 6

Preparation of a 70.04% solids ozone-friendly correction fluid. Example 5 was repeated with the exception that carbon black was added.

| Ingredients | Amount (g) | (%) |
| --- | --- | --- |
| JONCRYL - 680 Flakes | 30.0 | 9.16 |
| JONCRYL - 77 Emulsion (45% solid) | 17.5 | 5.34 |
| Titanium dioxide (TRONOX CR-800) | 150.0 | 45.78 |
| Talc | 30.0 | 9.16 |
| Propylene Glycol | 30.0 | 9.16 |
| Carbon Black | 0.13 | 0.04 |
| Acetone | 70.0 | 21.36 |

The correction fluid was applied to paper and formed a film which displayed excellent film coverage, film drying, film smoothness, film flexibility, and hiding power on ink-jet printed paper.

EXAMPLE 7

Preparation of a 70.52% solids ozone-friendly correction fluid. A different titanium dioxide was used.

| Ingredients | Amount (g) | (%) |
| --- | --- | --- |
| JONCRYL - 678 Flakes | 60.0 | 9.67 |
| JONCRYL - 77 Emulsion (45% solid) | 30.0 | 4.84 |
| Titanium dioxide (TRONOX CR-834) | 360.0 | 58.04 |
| Carbon Black | 0.23 | 0.04 |
| Propylene Glycol | 30.0 | 4.84 |
| Acetone | 140.0 | 22.57 |

The JONCRYL-678 acrylic resin flakes were dissolved in acetone while stirring with a Waring Commercial Blender to form a solution. JONCRYL 77 Emulsion was slowly added to the solution. TiO$_2$ and Talc were mixed in the dry powder form and then added to the solution with stirring to form a slurry. Propylene glycol was added to the slurry while stirring to reduce the viscosity of the slurry. Carbon black was added to the slurry while stirring to match the color of the correction fluid with the paper to which it was applied. The correction fluid was stored in a container with an applicator brush.

The correction fluid was applied to paper and formed a film which displayed excellent film coverage, film drying (15–20 seconds), film smoothness, film flexibility, and hiding power.

EXAMPLE 8

Preparation of a 68.5% solids ozone-friendly correction fluid.

| Ingredients | Amount (g) | (%) |
| --- | --- | --- |
| JONCRYL - 678 Flakes | 30.0 | 8.55 |
| JONCRYL - 77 Emulsion (45% solid) | 15.5 | 4.42 |
| Titanium dioxide (TRONOX CR-800) | 200.0 | 57.04 |
| Carbon Black | 0.16 | 0.05 |
| Propylene Glycol | 30.0 | 8.55 |
| Acetone | 75.0 | 21.39 |

The JONCRYL-678 acrylic resin flakes were dissolved in acetone while stirring with a Waring Commercial Blender to form a solution. JONCRYL 77 Emulsion was slowly added to the solution. TiO$_2$ and Talc were mixed in the dry powder form and then added to the solution with stirring to form a slurry. Propylene glycol was added to the slurry while stirring to reduce the viscosity of the slurry. Carbon black was added to the slurry while stirring to match the color of the correction fluid with the paper to which it was applied. The correction fluid was stored in a container with an applicator brush.

The correction fluid was applied to paper and formed a film which displayed excellent film coverage, film drying (15–30 seconds), film smoothness, film flexibility, and hiding power.

EXAMPLE 9

Preparation of a 70.15% solids ozone-friendly correction fluid. Example 9 was similar to Example 4 except that TRONOX CR-800 grade of titanium dioxide was used instead of TRONOX CR-822 in the correction fluid formulation.

| Ingredients | Amount (g) | (%) |
| --- | --- | --- |
| JONCRYL - 678 Flakes | 60.0 | 9.67 |
| JONCRYL - 77 Emulsion (45% solid) | 30.0 | 4.84 |
| Titanium dioxide (TRONOX CR-800) | 300.0 | 48.37 |
| Talc | 60.0 | 9.67 |
| Carbon Black | 0.22 | 0.04 |
| Propylene Glycol | 30.0 | 4.84 |
| Acetone | 140.0 | 22.57 |

The correction fluid was applied to paper and formed a film which displayed excellent film coverage, film drying (15–20 seconds), film smoothness, film flexibility, and hiding power on ink-jet printed paper.

EXAMPLE 10

Preparation of a 70.52 wt.% solids ozone-friendly correction fluid. Example 10 was similar to Example 9 except that TRONOX CR-837 grade of titanium dioxide was used instead of TRONOX CR-800 in the correction fluid formulation.

| Ingredients | Amount (g) | (%) |
|---|---|---|
| JONCRYL - 678 Flakes | 60.0 | 9.67 |
| JONCRYL - 77 Emulsion (45% solid) | 30.0 | 4.84 |
| Titanium dioxide (TRONOX CR-837) | 300.0 | 48.37 |
| Talc | 60.0 | 9.67 |
| Carbon Black | 0.23 | 0.04 |
| Propylene Glycol | 30.0 | 4.84 |
| Acetone | 140.0 | 22.57 |

The correction fluid was applied to paper and formed a film which displayed excellent film coverage, film drying (30–40 seconds), film smoothness, film flexibility, and hiding power on ink-jet printed paper.

Many variations will suggest themselves to those skilled in this art in light of the above detailed description. All such obvious modifications are within the full intended scope of the appended claims.

What is claimed is:

1. An ozone-friendly correction fluid having a solids content of 50 to 80 percent comprising:
   (A) 5 to 20 weight percent of an acrylic polymer having repeating units of the formula:

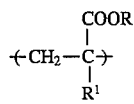

wherein R is selected from the group consisting of hydrogen and an alkyl group having 1 to 20 carbon atoms, and $R^1$ is selected from the group consisting of hydrogen and methyl, provided the acrylic polymer has a weight average molecular weight less than 40,000;
   (B) 20 to 60 weight percent an opacifying pigment; and
   (C) 15 to 25 weight percent of acetone.

2. An ozone-friendly correction fluid having a solids content of 50 to 80 percent comprising:
   (A) 5 to 20 weight percent of an acrylic polymer having repeating units of the formula:

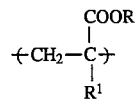

wherein R is selected from the group consisting of hydrogen and an alkyl group having 1 to 20 carbon atoms, and $R^1$ is selected from the group consisting of hydrogen and methyl, provided the acrylic polymer has a weight average molecular weight of 4,000 to 20,000, an acid number of 50 to 300, and a glass transition temperature of 5° C. to 110° C.;
   (B) 25 to 50 weight percent an opacifying pigment; and
   (C) 15 to 25 weight percent of acetone.

3. An ozone-friendly correction fluid having a solids content of 50 to 80 percent comprising:
   (A) 5 to 20 weight percent of an acrylic polymer prepared from a monomer selected from the group consisting of styrene, methacrylate, methylmethacrylate, butylacrylate, butylmethacrylate, 2-ethylhexylacrylate, 2-hydroxyethyl acrylate, hydroxyethylmethacrylate, acrylic acid, acrylamide, and acrylonitrile;
   (B) 35 to 45 weight percent of titanium dioxide; and
   (C) 18 to 22 weight percent of acetone.

4. The correction fluid of claim 1 wherein R is selected from the group consisting of hydrogen, methyl, ethyl, propyl, isopropyl, n-butyl, sec-butyl, isobutyl, tert-butyl, hexyl, heptyl, 2-ethylhexyl, 2-ethylbutyl, dodecyl, hexadecyl, 2-ethoxyethyl, and cyclohexyl.

5. The correction fluid of claim 1 wherein the acrylic polymer, component (A), is prepared from a monomer selected from the group consisting of styrene, methacrylate, methylmethacrylate, ethyl acrylate, butylacrylate, butylmethacrylate, 2-ethylhexylacrylate, 2-hydroxyethyl acrylate, hydroxyethylmethacrylate, acrylic acid, acrylamide, maleic anhydride, acrylonitrile, and combinations thereof.

6. The correction fluid of claim 1 which additionally contains 0.1 to 10 weight percent of a viscosity reducing agent selected from the group consisting of propylene glycol, glycerol, n-propanol, isopropanol, butanol and combinations thereof.

7. The correction fluid of claim 1 which additionally contains 0.1 to 20 weight percent of an additive selected from the group consisting of fillers, talc, clay, silica, fragrances, freeze-thaw stabilizers, dispersing agents, gums, leveling agents, chelating agents, colorants, dyes, pigments, and defoamers.

8. The correction fluid of claim 7 wherein the colorant is carbon black.

9. The correction fluid of claim 7 wherein the filler is talc.

10. The correction fluid of claim 1 which additionally contains 2 to 10 weight percent based on the weight of the correction fluid of an acrylic emulsion.

11. The correction fluid of claim 10 wherein the acrylic emulsion is present in an amount of 3 to 6 weight percent.

12. The correction fluid of claim 10 wherein the acrylic emulsion contains a high molecular weight acrylic polymer having a weight average molecular weight of 100,000 to 500,000, an acid number of 50 to 200, and a glass transition temperature of −20° C. to 120° C.

* * * * *